(12) United States Patent
Ein

(10) Patent No.: US 7,647,998 B1
(45) Date of Patent: Jan. 19, 2010

(54) COLLAPSIBLE POWERED OPERATED VEHICLE

(76) Inventor: Robert John Ein, P.O. Box 4307, Lexington, KY (US) 40544-4307

( * ) Notice: Subject to any disclaimer, the term of this patent is extended or adjusted under 35 U.S.C. 154(b) by 420 days.

(21) Appl. No.: 11/211,827

(22) Filed: Aug. 25, 2005

Related U.S. Application Data

(60) Provisional application No. 60/606,448, filed on Sep. 1, 2004.

(51) Int. Cl.
*B62D 61/00* (2006.01)
(52) U.S. Cl. ...................................... 180/208
(58) Field of Classification Search ................ 180/208, 180/210, 211, 215, 216, 65.1, 65.5, 908; 280/639, 641, 642
See application file for complete search history.

(56) References Cited

U.S. PATENT DOCUMENTS

| | | | |
|---|---|---|---|
| 6,371,235 B1* | 4/2002 | Wisecarver | 180/208 |
| 6,854,551 B2* | 2/2005 | Wisecarver | 180/208 |
| 2003/0141121 A1* | 7/2003 | Flowers et al. | 180/65.1 |
| 2007/0051548 A1* | 3/2007 | Kosco et al. | 180/208 |

* cited by examiner

*Primary Examiner*—Faye M. Fleming

(57) ABSTRACT

Advances in robotics have had a great influence in the design and performance of motorized assistive devices in the past two decades. Specifically, introduction of "intelligent" system technologies has enabled users of motorized assistive devices to better control their machines and avoid problematic situations. However, one area of assistive devices that has not reaped the benefits of advances in the state-of-the-art, is major weight reduction in the overall design of these devices. Bulky motorized assistive devices hinder the range and portability of these devices and impact the ability of the user to manually handle these devices without assistance of mechanical lifting devices or individuals. This ultralight, collapsible powered operated vehicle (POV) is lighter than those available today by approximately 80%. This device addresses this issue by the development of an ultralight, collapsible POV, which will replace the bulky and heavy motorized assistive devices currently being used. Present day motorized assistive devices are mostly very heavy, have limited turning capability, are short ranged due to excessive power drain, and are prone to failure due to mechanical failure of internal/external component(s) because of environmental conditions. Users of the ultralight, collapsible POVs will have increased travel range prior to receiving a recharge not available in present-day motorized assistive devices. They will be easy to transport because of their ultralight weight.

21 Claims, 10 Drawing Sheets

SIDE VIEW

TOP VIEW

COLLAPSIBLE POWERED OPERATED VEHICLE

This application claims the benefit of U.S. Provisional Application No. 60/606,448 filed Sep. 1, 2004, incorporated by reference herein in its entirety.

BACKGROUND OF THE INVENTION

1. Technical Field

Presently there are many types of personal mobility vehicles, also known as Power-Operated Vehicles [POVs] (some are referred to as scooters) used by certain physically challenged individuals and certain morbidly obese individuals that have difficulty in standing/walking for any period of time. The present POV designs are inherently unstable in nature because of their basic design philosophy. The inability to assist certain individuals with severe physical mobility problems is a major limiting feature in the existing POV designs.

Present-day POV designs, in most cases, are unable to satisfy these individuals and in some cases cause dangerous conditions such as falls. Because of this instability certain physically challenged individuals and morbidly obese individuals are not afforded the chance for mobility without the aid of an assistant.

With the increasing aging population there will be a growing need to provide some form of mobility to this ambulatory physically challenged group and morbidly obese individuals without being dependent on assistance. Review of current literature and US Patents indicate that there is no real effort to remedy these deficiencies. Conditions can range from morbid obesity to fracture(s), orthopedic surgery (such as joint replacements), amputations, stroke, arthritis, etc.

US Census Bureau Report, Americans with Disabilities: 1997 stated that about 20% (52.6 million) of individuals above the age of fourteen had some disability of which more than 4% (8.6 million) used some type of ambulation assistive device. As of 2000, there are more than 142,000 individuals using POVs. Over 62% are under the age of 65. Individuals with diverse disabilities extensively use existing POVs. They have not changed in their basic design since their inception in 1924.

Falls are a serious problem among senior adults. In the United States, ⅓ of individuals over the age of 64 sustains a fall. Older individuals are hospitalized for fall related injuries five times more often than for any other reason, of which nearly 30% suffer moderate to severe injuries that result in reduced mobility and risk of death.

The main aim of this invention is to improve the POV to provide unassisted mobility, exercise and higher quality of life to certain physically challenged individuals and morbidly obese individuals that are not adequately served by existing POVs. This will allow these individuals to move freely and rapidly over most terrain and to accomplish a variety of activities such as shopping, camping, limited hiking, tourist attractions and use of public transport.

POVs have reached widespread acceptance for use by physically challenged individuals with partial or total walking disability. POVs are generally roughed, employ wider tires, than wheelchairs so they may be maneuvered over terrain not generally accessible by wheelchairs.

Most present-day POVs require some form of disassembly for storage and/or transfer to another location. However, these POVs are heavy, ranging from 50 to almost 200 pounds. The disassembly is supposed to be simple but in most cases it requires some other person other than the physically challenged individual to perform this operation.

Every individual with disequilibrium, functional mobility limitations, postural instability or other movement disorders is an appropriate candidate for the POV. The device provides balance and mobility to a broad spectrum of physically challenged individuals. The health costs associated with falls are pervasive and substantial, and they increase with fall frequency and severity.

The invention design provides the user of the POV the ability to store or activate the POV without any great external physical input. Physically challenged individuals that have both or a single upper limited or non-functioning limb(s) can function with the use of the proposed POV along with obese individuals that require some means of transport to accomplish certain tasks. The inoperative limbs may be the result of obesity, spasmodic episodes or some other abnormality. The POV is designed so that it can traverse any terrain that any type of wheelchair is able to presently plus be able to maneuver in locations that present-day wheelchairs are not, by virtue of the improved POV design philosophy.

The POV's design has the capability to affect the general aging population and group of active sports enthusiasts who will likely experience at least one serious injury in their lifetime that would require the use of a POV. The use of this POV would have the capability to reduce the cost of rehabilitation treatment.

2. Description of the Prior Art

Extensive prior art research and patent searches have indicated that no similar device exists in the marketplace or has been proposed through the United States Patent and Trademark Office (USPTO) or foreign patent offices. In fact, we have the only existing intellectual property in such a device. In addition to the novel aspects of the collapsing/erection assist mechanical design of the POV, the POV incorporates advanced technology.

Prior POV designs were developed to assist physically challenged individuals. There are more than 100 types of POVs on the market. Electric POVs weigh between 50 and 200 pounds and they support up to a maximum of 400 pounds. The most prevalent is the basic 3-wheeled frame. The triwheel or delta frame has a single wheel in front and two drive wheels on the sides and has a smaller turning radius. However, they are less stable than 4 wheeled models, but are easier to use. The four-wheeled frame model is boxed shaped, with drive wheels on the side. The front wheels provide steering. Unlike the basic 3-wheeled frame they have a larger turning radius. These POVs are found to be unstable in many conditions.

There are many patents for different electric POV types. The following is a sample of these patents.

1. Mowat et al., U.S. Pat. No. 4,452,327 was the first patent to embody the design of today's POV. The following discrepancies are noted in the collapsing of the POV: 1) It has a complex hook and latch mechanism that needs to be disengaged in order to collapse the POV; 2) the seat assembly must also be removed, but this portion can not be completely collapsed; 3) The rear wheels axles must be collapsed; 4) The batteries have to be removed so the POV can be reduced to its minimum size; 5) mechanical brakes are used in the POV design which is hazardous to the user; 6) The drive mechanism is dual 12 volt motors that are coupled to the drive wheels by a rubberized sprocket belt. Without proper adjustment, excessive power loss will result in the use of this type of power transfer technique; and 7) No reverse control readily available for the user. The collapsed POV is very bulky and heavy.

2. Kramer, U.S. Pat. No. 4,570,739 the following discrepancies are noted in the collapsing of the POV: 1) The handle is split in half and needs to be disengaged in order to collapse the POV; 2) the seat assembly must also be removed, but this portion can not be completely collapsed; 3) The rear wheel drive is coupled to the motor by means of a belt which is prone to slippage during weather changes; 4) The batteries have to be removed so the POV can be reduced to its minimum size; 5) mechanical brakes are used in the POV design which is hazardous to the user; and 6) Rear wheels must be disengaged in order to fully collapse the POV. This POV in the collapsed mode is very bulky and heavy.

3. Hopely, Jr., U.S. Pat. No. 4,947,955 the following discrepancies are noted in the collapsing of the POV: 1) The handle is split in half and needs to be disengaged in order to collapse the POV; 2) the seat assembly must also be removed, but this portion can not be completely collapsed; 3) The frame splits into two (2) pieces; 4) The batteries have to be removed so the POV can be reduced to its minimum size; and 5) mechanical brakes are used in the POV design which is hazardous to the user. This POV in the collapsed mode is also very bulky and heavy. This design introduces the transaxil as the drive method of the POV.

SUMMARY OF THE INVENTION

Presently there are many techniques for providing maximum structural capabilities to portable and collapsible POV designs. These POV designs have inherent deficiencies because of limited power, space and roughness required in their use. The present rear wheel drive mechanism for most POVs is a single reversible DC motor coupled to the transaxle which in turn drives the two back drive wheels. The weight of this configuration is about 50 pounds: 12 pounds for the motor unit; 25 pounds for the transaxle unit; 8-12 pounds for wheels; 2 pounds for controller box; and 3-5 pounds for the frame unit which holds and supports these units. Presently there are many techniques for providing maximum torque to the drive wheels. These drive mechanism designs have inherent deficiencies because of limited torque available, coupling slippage, limited power, limited space and roughness required in their use.

The POV uses specialized wheel sets to navigate over various surfaces. The POV has a front steering wheel and primary drive wheels at the rear portion of the POV. In the basic motorized configuration of the POV, the user provides certain hand movements of the control mechanism, which in turn produces control signal(s). In the basic powered version the user will determine speed of the POV by sending the appropriate control signal(s) to the drive unit. The power drive unit consists primarily of two drive motors, gear reduction units, coupling mechanisms and electronic control. The drive wheels require some sort of tread design in order to maneuver properly in different types of terrain like standard automobile tires. Specialized tread designs are used for specific terrain or a generalized tread design that will be effective over most terrain. Incorporated in the POV is a collapsing/erection assist mechanism, which aids the morbidly obese and/or handicapped individual to stow or activate the POV without any assistance. Steering is accomplished by control signals generated by the user to drive a reversible DC motor that rotates the forward drive wheel unit to the desired alignment direction. Also, a built-in power source such as a lithium battery/Zinc matrix or some other power source (such as fuel cell(s), storage capacitor(s), etc.) will provide the power required for both the control module and drive motors.

The overall POV is designed for ease of use, transport and storage. In designing mobility and stability into the POV, overall effectiveness and safety is not compromised. For ease of transport and erection, a collapsing/erection assist mechanism is incorporated into the design of the POV. The mobility of the POV is determined and measured by the ability of the POV's freedom of movement (percentage of the terrain over which the POV is mobile) and its average speed or travel time over any given terrain. A POV's weight plus the physically challenged individual's weight upon the POV and outrigger footprint (the area of outrigger projection which impacts any given surface) determine the resultant surface pressure that the POV imparts on any given surface. The surface pressure, coupled with the POV's stability will determine the POV's mobility and stability effectiveness and is defined as the POV's Mobility Index (PMI). The higher the PMI, the less mobile/stable the POV becomes. As a general rule of thumb, a lower PMI not only equates to better surface mobility and stability but also indicates better performance on inclines, in non-stable surface (such as sand, snow, etc.), over obstacles/gaps crossings and when traversing vegetation, carpets, etc.

BRIEF DESCRIPTION OF THE DRAWINGS

Other objects and advantages of the present invention will become apparent from the following detailed description of the preferred embodiment of thereof taken in conjunction with the accompanying drawings, wherein:

FIG. 9A is the side view for the erection/collapse mechanism for the seat mechanism of the invention in the full extension mode;

FIG. 9B is the front view for the erection/collapse mechanism for the seat mechanism of the invention in the full extension mode;

DETAILED DESCRIPTION OF THE PREFERRED EMBODIMENTS

Figure 1:
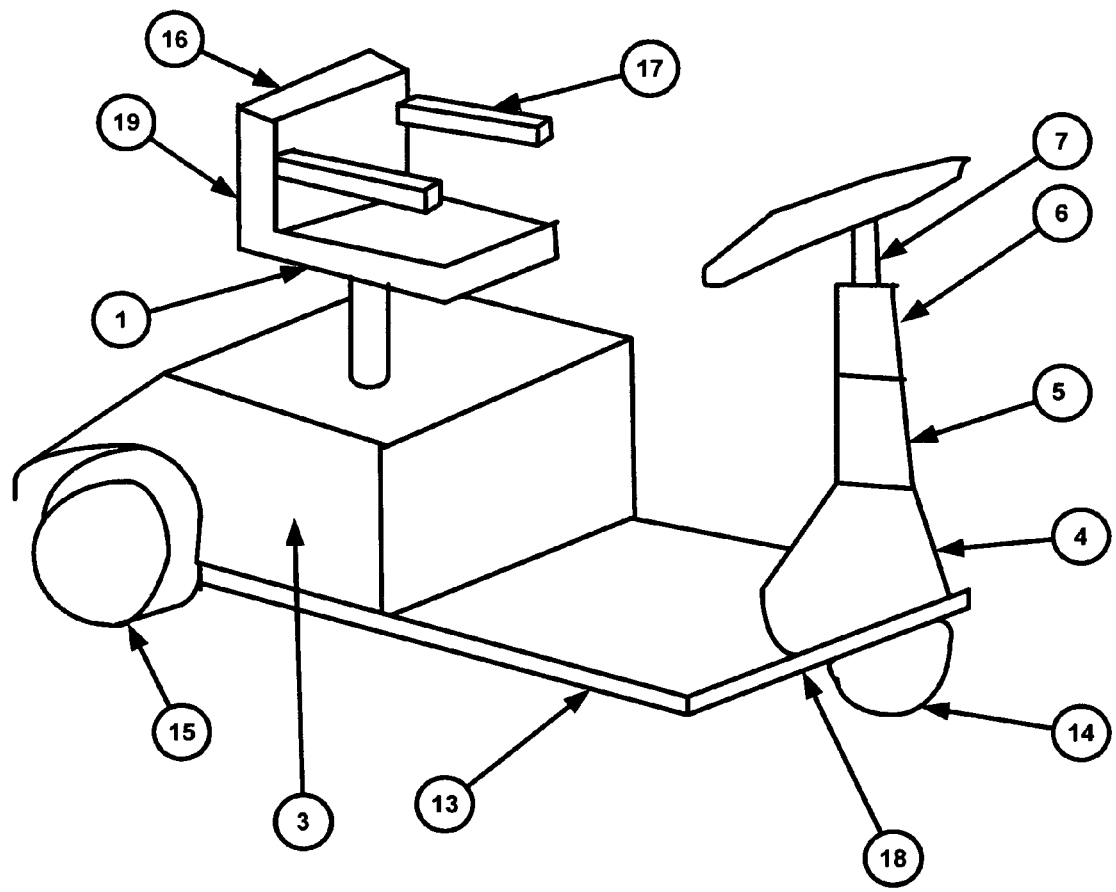
FIG. 1 is an external view of the invention and depicts the apparatus in is it fully deployed mode configuration.

Referring now to the drawings, wherein identical numerals indicate identical parts, and initially to FIG. 1, which shows the external view of the device in its fully extended position.

FIG. 1 shows the external view of the apparatus and consists of the following sub-systems and interfaces: 1) Steering/Control Column Sub-system; 2) Main Frame Sub-system; 3) Propulsion/Power/Interface Sub-system; and 4) User Seat Sub-system.

Figure 5:
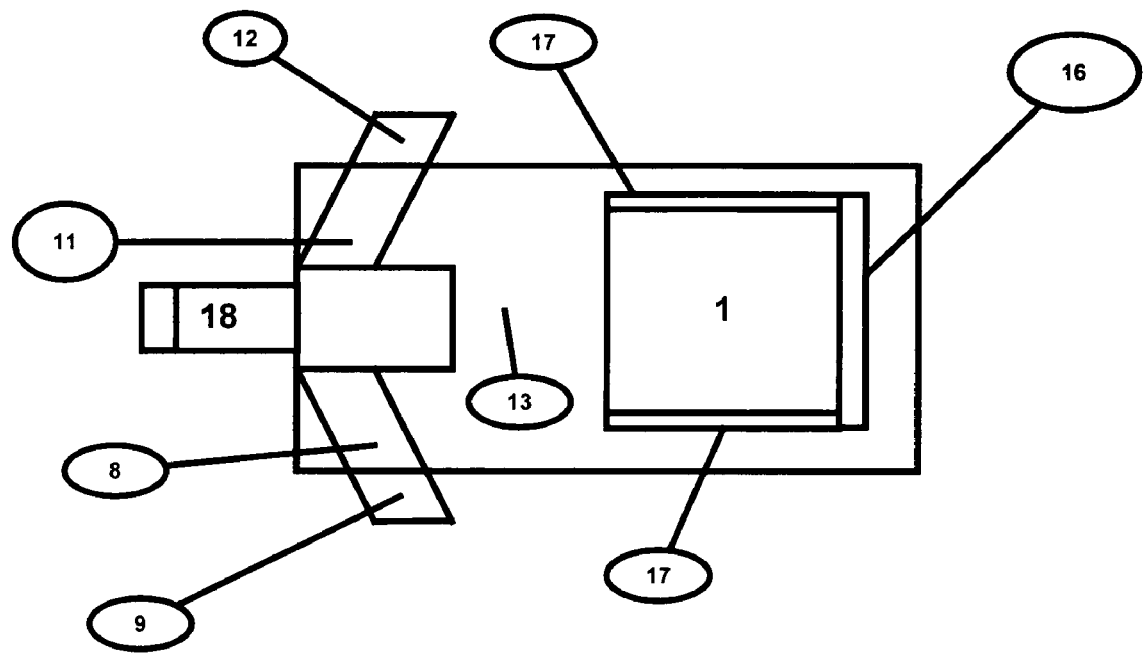
FIG. 5 is a schematic top view of the mechanical configuration of the invention.

As seen in FIG. 1 the Steering/Control Column Sub-system is mounted to the forward region of the main frame unit 13. Steering segment unit 4 is attached to the main frame unit 13. The bottom side of steering segment unit 4 provides the first support means for the overall steering column units 4, 5, 6 and 7. The instrumentality used to mount these structures may be well known in the art, for example, the components may be welded, bonded, fused, connected by a host of bolts/fasteners, or other forms of attachment. The Steering/Control Column Sub-system includes a steering wheel housing and a plurality of steering segment units, a steering handle unit 9 and 12 (see FIG. 5), and locking mechanisms 8 and 11. FIG. 1 illustrates a plurality of four steering segment units including steering segment units 4, 5, 6, and 7. The bottom side of the steering unit 4 is the first support member of the Steering/Control Column Sub-system. The apparatus illustrated in FIG. 1 typically could be used by an average height adult, whereas an apparatus used by a child would require a fewer number of steering segment units. Control means for the apparatus, such as speed, direction and steering is provided by steering column unit 7 and control switches within the steering handle units 9 and 12. Steering handle units 9 and 12 provide manual adjustment for steering control of the apparatus and manual adjustment for speed control of the apparatus. The locking mechanism units 8 and 11 which are connected to steering unit 7 and contain the on/off switch not (not shown), forward/reverse switch mechanism and power source availability read-out device not shown); left-hand speed control device and handle unit 9; and right-hand speed control device and handle unit 12 as shown in FIG. 5. The steering segment units 4, 5, 6, and 7 may be mounted in any manner as is well-known in the prior art for carrying out a telescopic movement, for example, of steering segment unit 7 into steering segment unit 6, and so on. The individual steering segment units may be pneumatically operated or controlled in any other manner.

The Main Frame Sub-system consists of the following: 1) main frame unit 13; 2) power source and control unit 3; and power drive wheel unit 15.

Figure 6A:
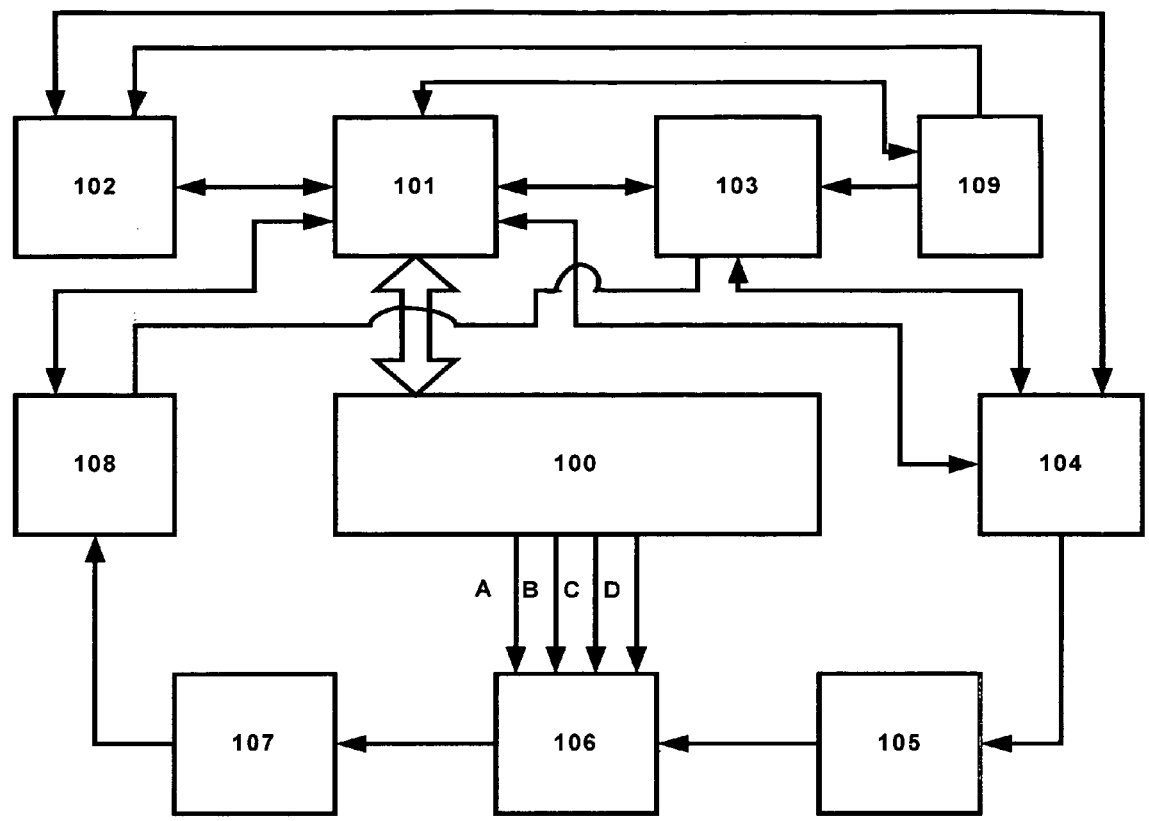
FIG. 6A is the block diagram for the power source for the invention.
Figure 6B:
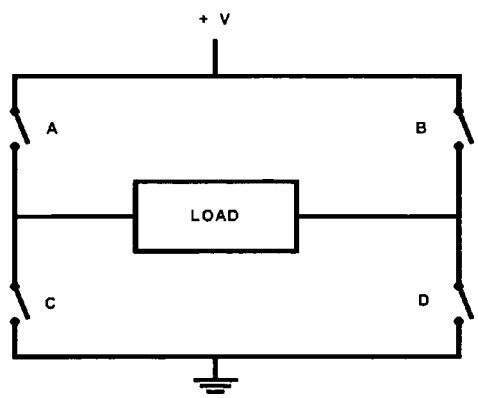
FIG. 6B is a simple conceptual schematic of the H-bridge for the invention.

The Propulsion/Power/Interface Sub-system as shown in FIGS. 6A and 6B.

As seen in FIG. 1 the User Seat Sub-system is mounted to the rearward region of the main frame unit 13 and mounted to the top portion of the power source and control unit 3. The methods for interconnecting lower seat member or the seat unit 1 to the power source and control unit 3 is the support column unit 2, the back support unit 16 is then connected to seat unit 1, and the arm support unit 17 in like manner is attach to back support unit 16. Instrumentality used to mount these structures may be well known in the art, for example, the components may be welded, bonded, fused, connected by a host of bolts/fasteners, or other forms of attachment. The User Seat Sub-system includes the following: 1) seat unit 1; 2) back support unit 16; 3) adjustment slot 19 for arm support unit 17; and 3) arm support units 17.

Figure 2:
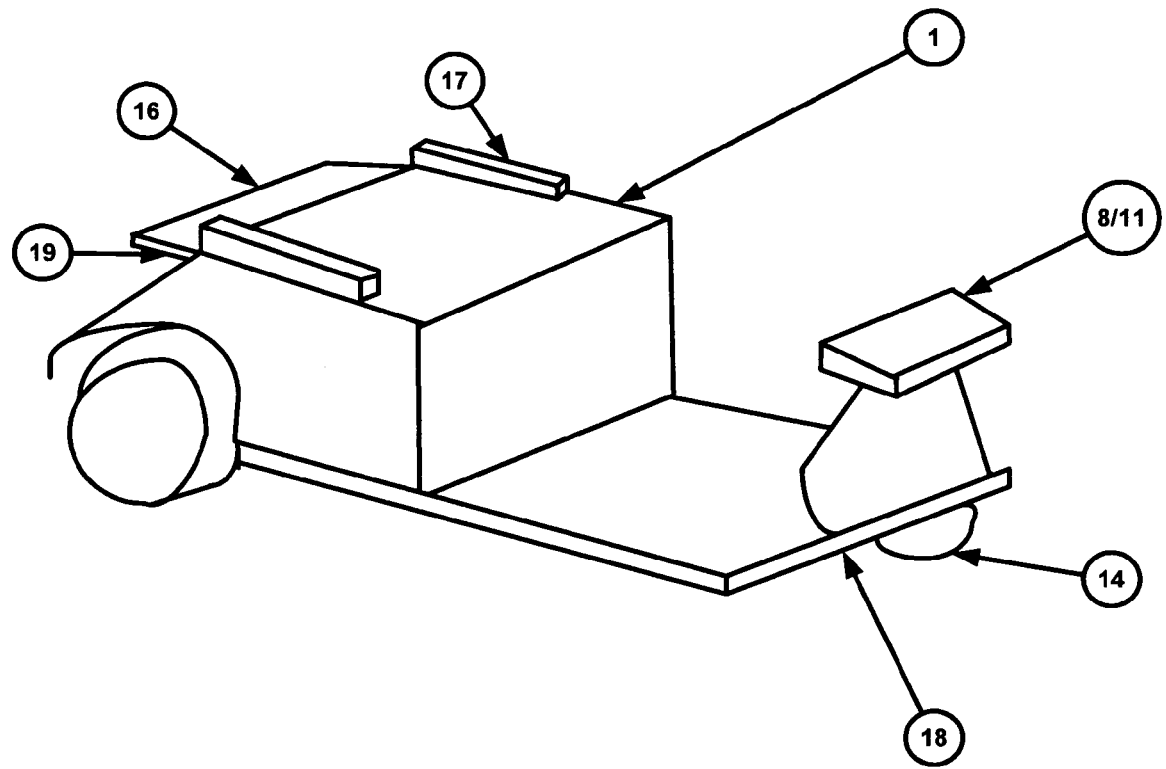
FIG. 2 is an external view of the apparatus and depicts the invention in a partially collapsed mode configuration.

Referring to FIG. 2, which shows the apparatus in a partial collapsed mode and shows the mounting of various seat assembly units. The instrumentality used to mount this structure may be well known in the art, for example, the components within the structure may be welded, bonded, fused, connected by a host of bolts/fasteners, or other forms of attachment. The view shows the back support unit 16 folded backwards; Seat unit 1 partially lowered into power source and control unit 3; Arm support unit 17 can be moved up and down the adjustment slot 19; Steering segment units 5,6 and 7 telescoped and nested into the steering wheel housing and steering segment unit 4 (not shown {see FIG. 1}); Pull handle unit 18 partially extended; Partially retracted steering and control handle units 9 and 12 (not shown {see FIG. 1}); and Front wheel unit 14 stored into steering wheel housing and steering segment unit 4 (not shown {see FIG. 1}). As seen in FIG. 1 the power drive rear wheel unit 15 is mounted to the rearward region of the main frame unit 13. The instrumentality used to mount this structure may be well known in the art, for example, the components may be welded, bonded, fused, connected by a host of bolts/fasteners, or other forms of attachment. Motion producing method is accomplished in the apparatus by the Dower drive unit 15. The power drive unit 15 produces the required motion of directional rotation and speed motion of the apparatus. Speed by control methods are by either electrical, electronic and/or mechanical in nature. The power drive unit 15 provides the necessary propulsion for the apparatus.

Figure 3:
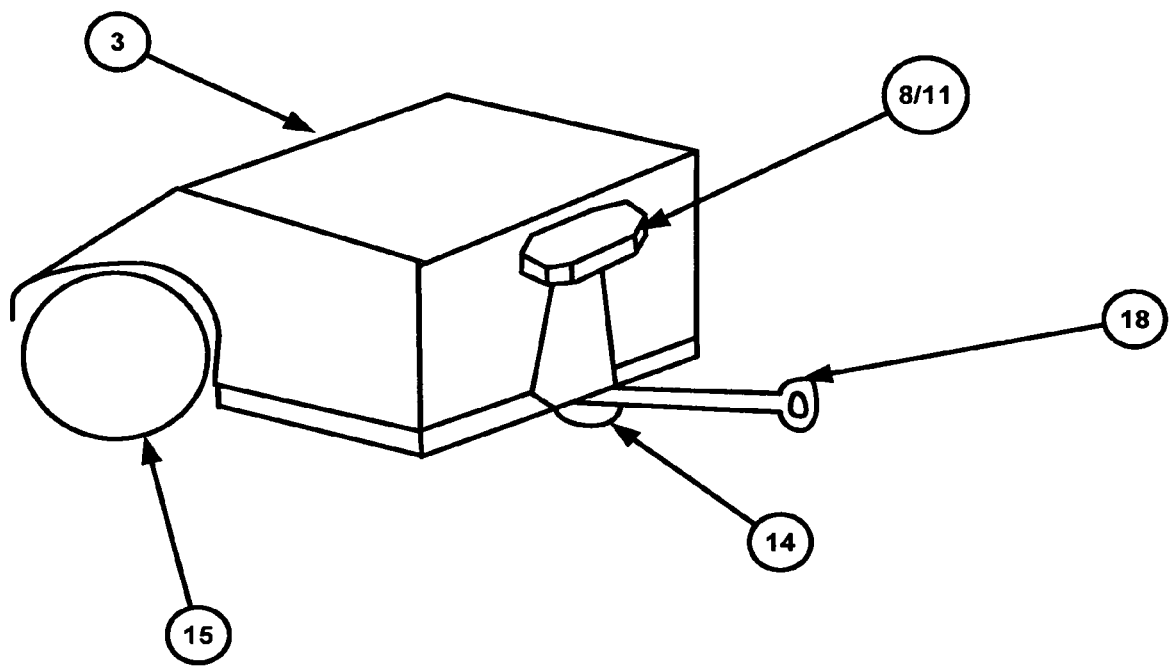
FIG. 3 is an external view of the invention and depicts the apparatus in a fully collapsed mode configuration.

FIG. 3 shows the apparatus in the fully collapsed mode. The view shows the back support unit 16 completely folded; seat unit 1 completely lowered into power source and control unit 3 (not shown {see FIG. 1}); steering column segment units 5,6 and 7 (not shown) fully nested into the steering wheel housing and steering segment unit 4 {see FIG. 1}; fully retracted steering and control handle units 9 and 12 (not shown {see FIG. 1}); pull handle unit 18 fully extended; Front wheel unit 14 stored into steering wheel housing and steering segment unit (see FIG. 1); locking mechanism units 8 and 11 are fully retracted; and main frame unit 13 fully retracted and nested into power source and control unit 3 (not shown {see FIG. 1}). As seen in FIG. 1 the power drive rear wheel unit 15 is mounted to the rearward region of the main frame unit 13. The instrumentality used to mount this structure may be well known in the art, for example, the components may be welded, bonded, fused, connected by a host of bolts/fasteners, or other forms of attachment. The power drive unit 15 provides the necessary propulsion means for the apparatus.

Figure 4:
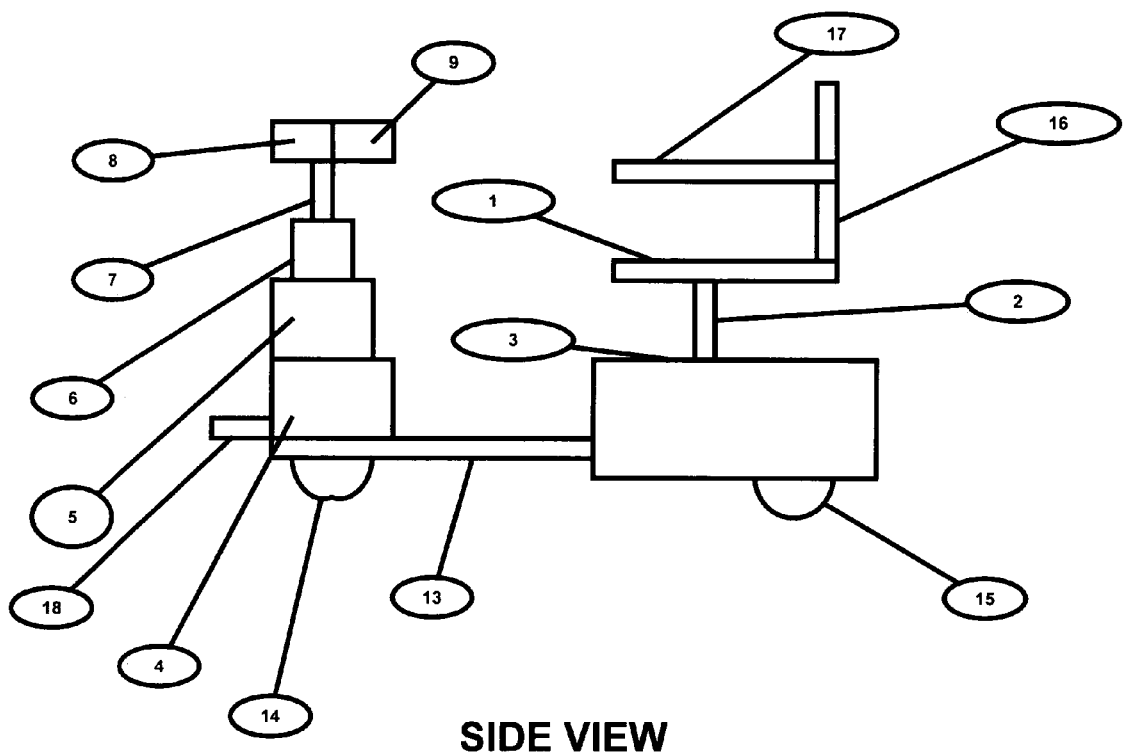
FIG. 4 is a schematic side view of the mechanical configuration of the invention.

In FIG. 4 is shown the external side view of the invention. The view shows the back support unit 16 in the upright configuration; seat unit 1 is fully extended by support column unit 2 which is connected to the power source and control unit 3; arm rest units 17 are fully extended; steering column segment units 5,6 and 7 are fully extended from the steering wheel housing and steering segment unit 4; pull handle unit 18 is fully retracted; steering and control handle unit 9 is fully deployed; locking mechanism unit 8 is fully deployed; drive wheel unit 15 is engaged; and front wheel unit 14 is fully extended from the steering wheel housing and main column unit 4.

FIG. 5 shows the external top view of the invention. The view shows the back support unit 16 in the upright configuration. The Back Support Unit 16 is the back support member for the apparatus; Seat unit 1 is fully extended; Power source and control unit 3 is shown; Arm rest units 17 are fully extended. The Arm Rest Units 17 are the arm support members for the apparatus; Pull handle unit 18 is fully extended; Steering and control handle units 9 and 12 are fully deployed; Locking mechanism units 8 and 11 are fully deployed; and main frame unit 13 is shown fully extended.

In FIG. 6A, which shows the block diagram for the power source of the invention. The master control unit for the power source is the microprocessor unit 100, which controls the controller and status monitor unit 101 and H-bridge unit 106. Controller and status monitor unit 101 sends and receives data and status reports from DC/DC converter unit 104, charger unit 109, Electrochemical "EC" capacitor unit 102, regenerative braking unit 108, and battery unit 103. Charger unit 109 receives status from battery unit 103 and "EC" capacitor unit 102. Its recharges battery unit 103 and "EC" capacitor unit 102 as required. The battery unit 103 is the primary power source and the "EC" capacitor unit 102 and is the secondary source of power. The "EC" capacitor has the unique ability of handling high power cycles without damage to the battery unit or other components within the power source. Compared to batteries, "EC" capacitors have lower energy density. However, they can be cycled tens of thousands of times and are not subject to deterioration when charged quickly or discharged rapidly like batteries. The addition of the "EC" capacitor within the power source greatly augments the utilization of the battery unit especially during high discharge rates because of the high power density of the "EC" capacitor (~$10^6$ Watts/kilogram). So during high power demands the "EC" capacitor aids in supplying the power required instantly while the battery unit 103 and regenerative braking unit 108 recharge it. The controller and status monitor unit 101 monitors battery unit 103, regenerative braking unit 108 and "EC" Capacitor unit 102. Output of battery unit 103 and "EC" Capacitor Unit 102 are connected to DC/DC converter unit 104. The controller and status monitor unit 101 measures the battery unit voltage, the battery unit's state-of-charge, the scooter's speed, the instantaneous currents in both the drive motors and "EC" capacitor unit, and the actual voltage of the "EC" capacitor unit. The microprocessor unit 100 manipulates all the variables and generates the Pulse Width Modulation (PWM) switching pattern for the H-bridge unit 106 to control the speed of the drive motors. When the scooter's operates at high speeds, the controller and status monitor unit 101 keeps the "EC" capacitor unit 102 discharged. If the scooter is not operating, the "EC" capacitor unit 102 remains charged at full voltage. During medium speeds the "EC" capacitor unit 102 is at medium voltage, to allow for future accelerations. The battery unit 103 voltage is an indication of the scooter's instantaneous situation. When the scooter is accelerating, the battery voltage goes down, which indicates that the controller and status monitor unit 101 must take energy from the "EC" capacitor unit 102. In the opposite situation (regenerative braking), the battery voltage goes up, and the controller and status monitor unit 101 needs to activate the DC/DC converter unit 104 to store the kinetic energy of the scooter into the "EC" capacitor unit 102. The battery unit 103 state-of-charge is used to change the voltage level of the "EC" capacitor unit 102 at predetermined levels. The battery unit 103 is fully charged, the voltage level of the "EC" capacitor unit 102 is kept at lower levels than when the battery is partially discharged. Power is sent from the DC/DC converter unit 104 to the snubber unit 105, which is used to control the effects of the power source's reactance component. The output of the snubber unit 105 is connected to the H-bridge unit 106. The H-bridge unit 106 is the simplest, reversible drive circuit. It consists of 4 switch devices as a means of completing a circuit to drive a motor (see FIG. 6B). The H-bridge unit 106 output provides power for the motor units 107. The motor unit 107 consists of shunt motors which acts as generators during braking action. In addition there is a regenerative braking unit 108 to produce addition power for the power source.

In addition FIG. 6B shows a simple conceptual schematic of the H-bridge. The switch devices are labeled A, B, C and D. Since each of the switch devices can either be open or closed, there are 16 combinations of switch settings> Many are not useful and some can short out the power source. There are 4 combinations that are useful and are shown in chart 1 below:

| Closed switches | Polarity | Effect |
| --- | --- | --- |
| A and D | Forward | Motor spins forward |
| B and C | Reverse | Motor spins backward |
| A and B | Brake | Motor acts as a brake |
| None | Free | Motor spins freely |

Figure 7:
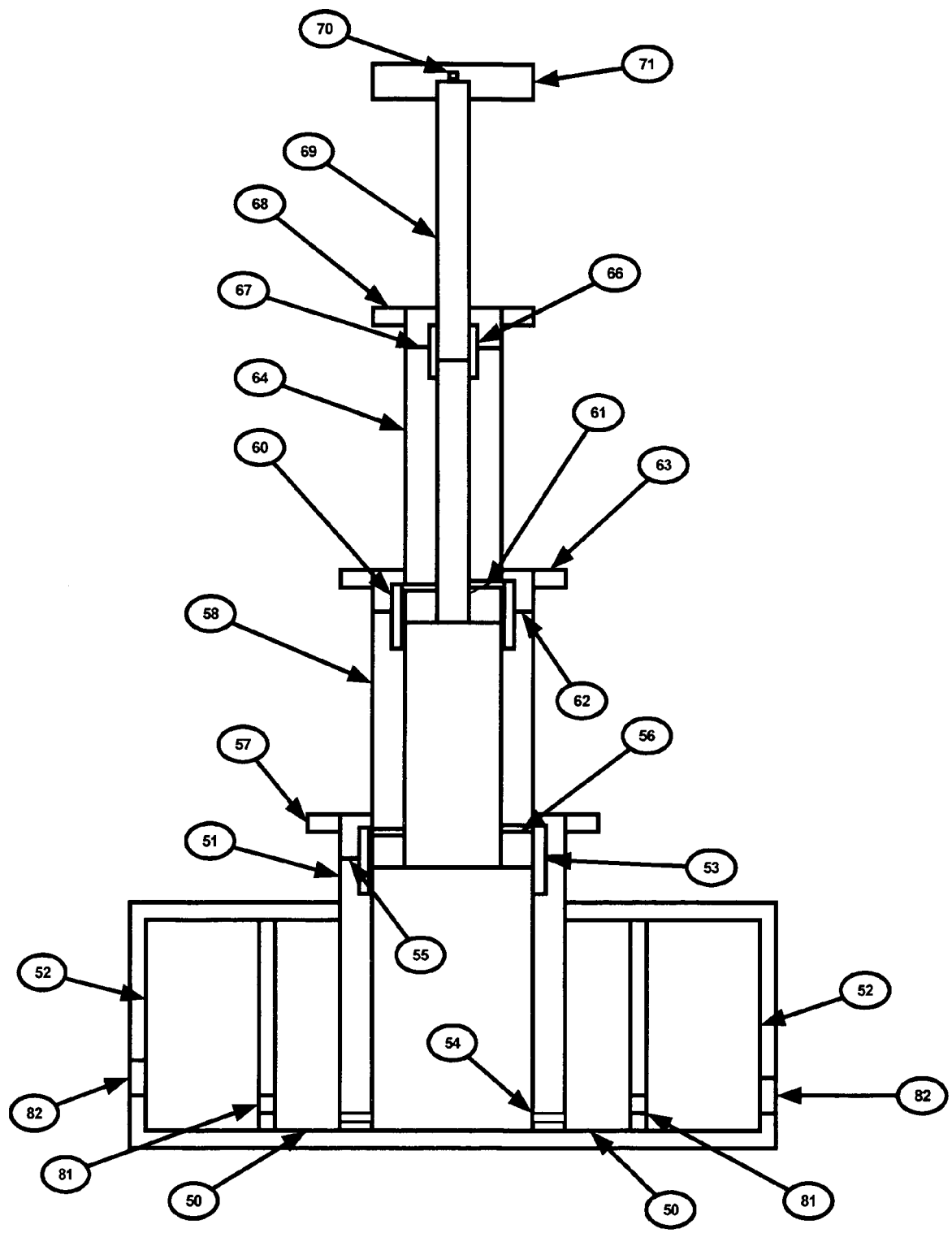
FIG. 7 is the side view for the erection/collapse mechanism for the steering/control column unit of the invention.

FIG. 7, shows the side view of the erection/collapse mechanism for the steering/control column unit of the apparatus. Shown is the open loop pneumatic version (not shown is the closed loop hydraulic version). The erection/collapse mechanism for the steering/control column unit consists of the $1^{st}$ cylinder unit 51; 1st reservoir tank unit 52; $2^{nd}$ reservoir tank unit 50; transfer valve unit 81 controlling the flow of fluid between the $1^{st}$ and $2^{nd}$ reservoirs 52, 50; interior shoulder 55 of the $1^{st}$ cylinder unit 51; a release valve unit 54 providing a gas path between the $1^{st}$ cylinder unit 51 and 2nd reservoir tank unit 50; a gas transfer tubing unit 53 for $1^{st}$ cylinder unit 51; gas bleed tubing unit 56 from the $1^{st}$ cylinder unit 51 into a $2^{nd}$ cylinder unit 58; skirt unit 57 of the $1^{st}$ cylinder unit 51; an interior shoulder unit 62 of the $2^{nd}$ cylinder unit 58; gas transfer tubing unit 60 for the $2^{nd}$ cylinder unit 58; $3^{rd}$ cylinder unit 64; bleed tubing unit 61 providing communication between the $2^{nd}$ cylinder unit and the $3^{rd}$ cylinder unit 64; skirt unit 63; interior shoulder unit 67 for the $3^{rd}$ cylinder unit 64; $4^{th}$ cylinder unit 69; gas transfer tubing unit 66 communicating between the $3^{rd}$ cylinder unit 64 and $4^{th}$ cylinder unit 69; skirt unit 68; control release valve unit 70; and attachment plate 71 which connects to locking mechanism units 8/11. Gas from the $1^{st}$ reservoir tank unit is released into $2^{nd}$ reservoir tank unit 50 by activation of the transfer value unit 55 by either mechanical linkage or control signal(s). Gas from the $2^{nd}$ reservoir tank unit is released into the $1^{st}$ cylinder unit 51 by activation of the transfer value unit 54 by either mechanical linkage or control signal(s). Then this released gas enters the $1^{st}$ cylinder unit 51 and at some point the pressure is great enough to raise $2^{nd}$ cylinder unit 58 to a position where the $2^{nd}$ cylinder unit 58 is stopped from further upward movement. Additional released gas will enter the $1^{st}$ cylinder unit 51 and $2^{nd}$ cylinder unit 58 and this is great enough it will raise 3rd cylinder unit 64 to a position where the 3rd cylinder unit 64 is stopped from further upward movement. When more released gas will enter the $1^{st}$ cylinder unit 51, $2^{nd}$ cylinder unit 58 and $3^{rd}$ cylinder unit 64 this is great enough it will raised $4^{th}$ cylinder unit 69 to a position where the $4^{th}$ cylinder unit 69 is stopped from further upward movement. Releasing the gas by activating control release value unit 70 can lower the total raised steering/control column unit of the apparatus. Refill valve unit 82 allows for replenishment gas for the $1^{st}$ reservoir tank.

Figure 8:
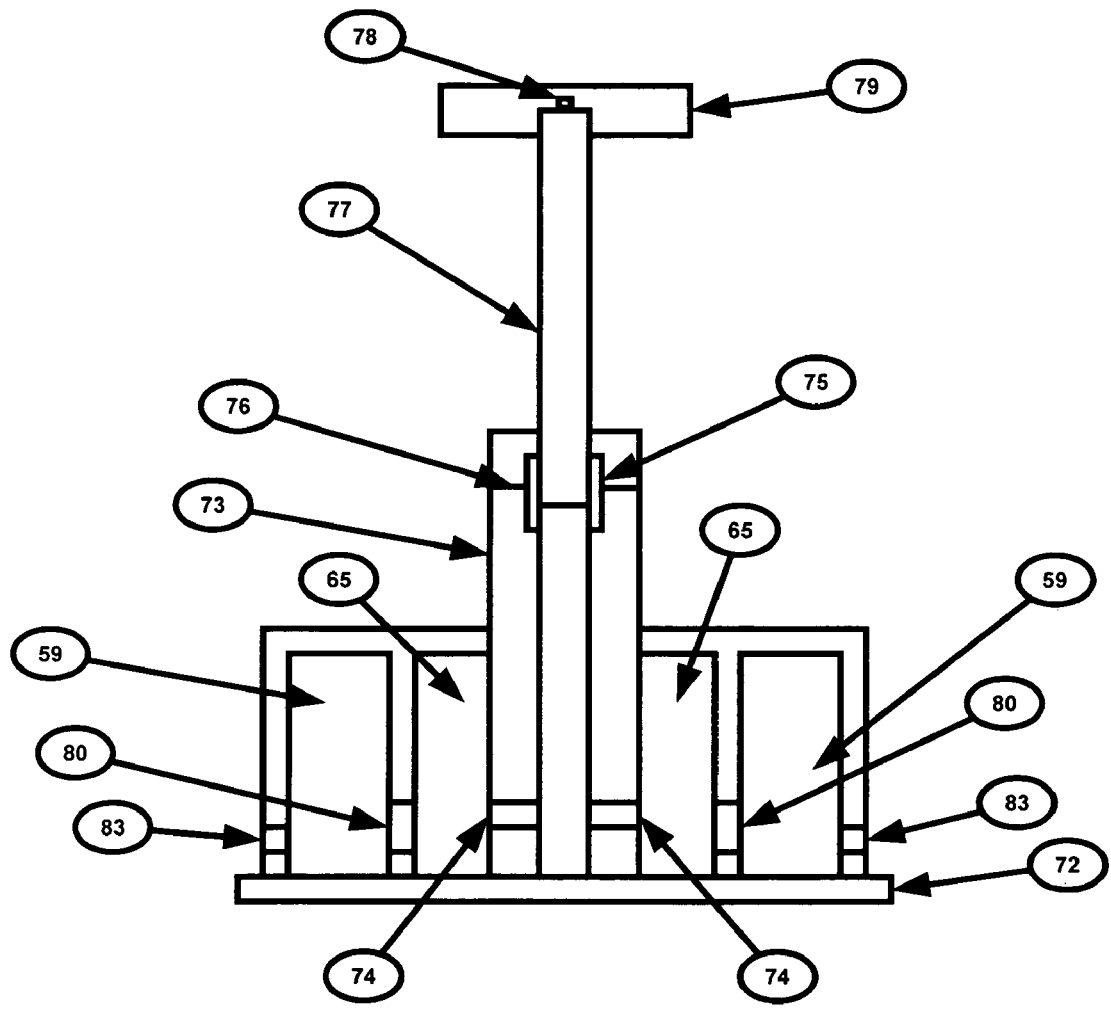
FIG. 8 is the side view for the erection/collapse mechanism for the seat unit of the invention.

In FIG. 8, which shows the side view of the erection/collapse mechanism for the support column unit for the seat of the invention. Shown is the open loop pneumatic version (not shown is the closed loop hydraulic version). The erection/collapse mechanism for the erection/collapse mechanism unit consists of the $1^{st}$ cylinder unit 73; $1^{st}$ reservoir tank unit 59; transfer value unit 80; $2^{nd}$ reservoir tank unit 65; interior shoulder of $1^{st}$ cylinder unit 55; release value unit 74 to $1^{st}$ cylinder unit from secondary reservoir tank unit 65; gas transfer tubing unit 75 for $1^{st}$ cylinder unit 73; $1^{st}$ cylinder unit 73 skirt unit 76; $2^{nd}$ cylinder unit 77; connection plate to control unit 3, interior shoulder of main cylinder unit 76, control pin 78, and attachment plate 79 which connects to seat unit 1. Gas from the $1^{st}$ reservoir tank unit 59 is released into $2^{nd}$ reservoir tank unit 65 by activation of the transfer value unit 80 by either mechanical linkage or control signal(s). Gas from the $2^{nd}$ reservoir tank unit 65 is released into $1^{st}$ cylinder unit 73 by activation of the transfer value unit 74 by either mechanical linkage or control signal(s). Then this released gas enters the $1^{st}$ cylinder unit 73 and at some point the pressure is great enough to raise $2^{nd}$ cylinder unit 77 to a position where the $2^{nd}$ cylinder unit 77 is stopped from further upward movement. Releasing the gas by activating control release value unit 78 can lower the total raised erection/collapse mechanism unit of the apparatus. Refill valve unit 83 allows for replenishment gas for the $1^{st}$ reservoir tank.

FIG. 9A, shows the side view of the seat in the fully raised position. The view shows the back support unit 16 in its upright position; seat unit 1 {not shown is covered by protective cover unit 25, roller guide unit 20 and roller unit 22; arm support unit 17; and moves up and down adjustment slot 19.

Referring to FIG. 9B, which shows the front view of the seat in the fully raised position. The view shows the back support unit 16 fully upright; seat unit 1; arm support units 17 fully extended; protective cover units 25

Figure 9C:
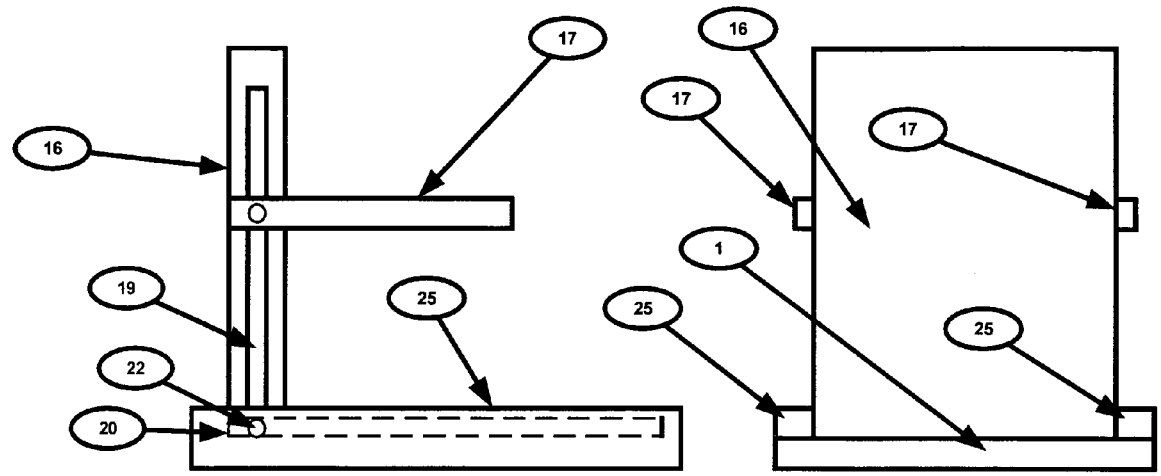
FIG. 9C is the side view for the erection/collapse mechanism for the seat mechanism of the invention in the collapsed mode.
Figure 9C:
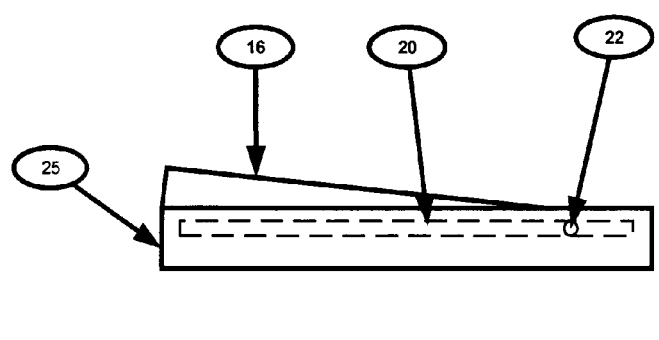

In FIG. 9C, which shows the side view of the seat in the collapsed mode. The view shows the back support unit 16 folded into seat unit 1; protective cover unit 25; and roller unit 22 has moved along roller guide unit 20.

Figure 9D:
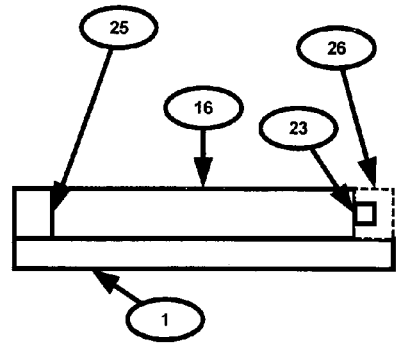
FIG. 9D is the front view for the erection/collapse mechanism for the seat mechanism of the invention in the collapsed mode.

FIG. 9D shows the front view of the seat in a collapsed mode. The view shows the back support unit 16 folded backwards into seat unit 1; protective cover unit 25; and roller unit 23 has moved along roller guide unit 26.

Figure 10:
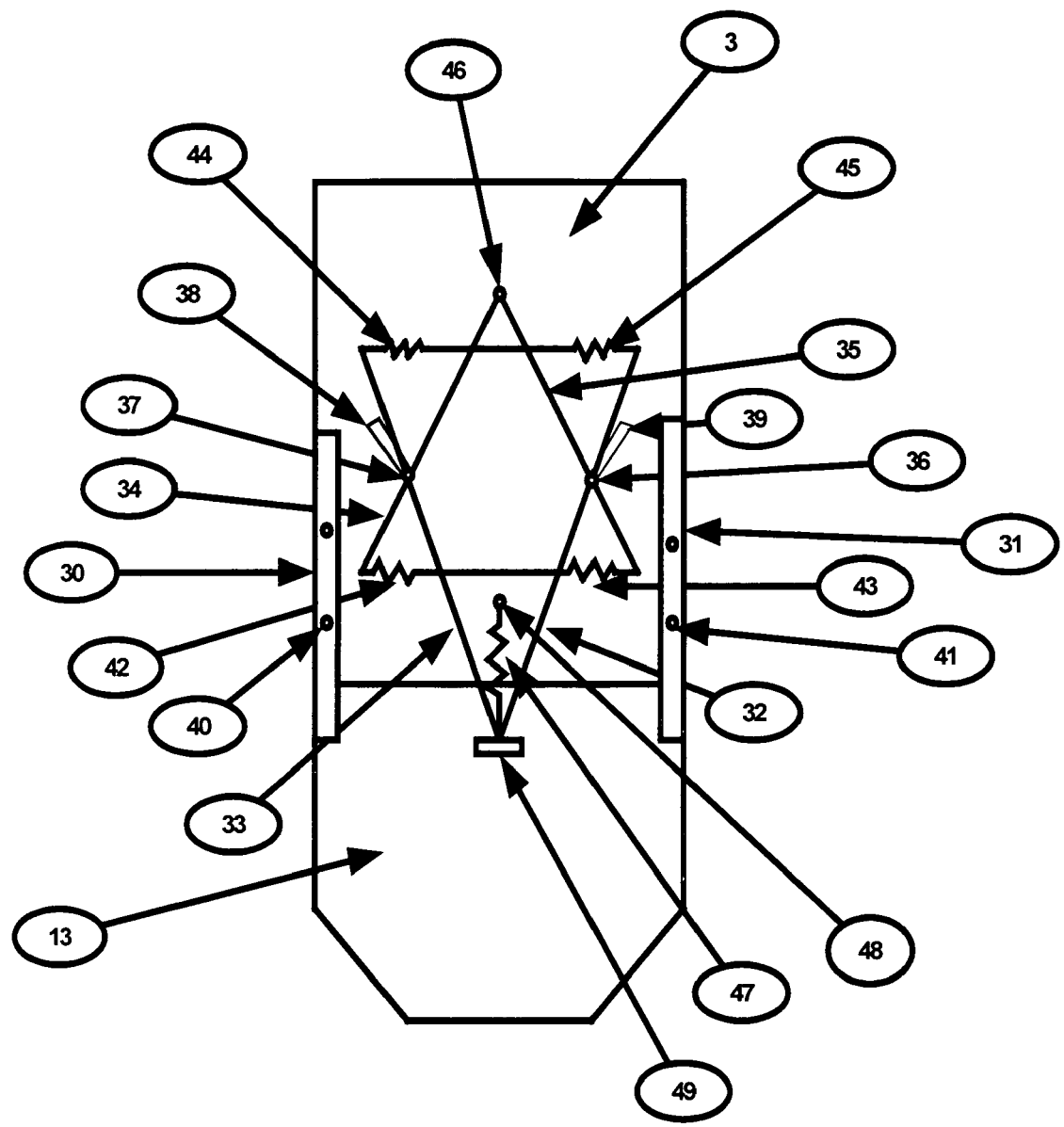
FIG. 10 is the bottom view for the erection/collapse mechanism for the main frame unit of the invention.

In FIG. 10, which shows the bottom view of the erection/collapse mechanism for the main frame unit 13 and control unit 3 of the invention. The erection/collapse mechanism for the main frame unit and control unit consists of the main frame unit 13, control unit 3; lateral spring units 42 and 43 which are connected lever arm units 34 and 35; lateral spring units 44 and 45 which are connected lever arm units 32 and 33; counter spring unit 47 which is connected to connection plate 49 along with lever arm units 33 and 32 and anchored to connection pin unit 48; lever arms 32 and 35 are connected to pivot and roller pin assembly 36 which moves in roller pin slot 39; lever arms 33 and 34 are connected to pivot and roller pin assembly 37 which moves in roller pin slot 38 and connected to pivot pit unit 46; and main frame unit 13 and control unit 3 move back and forth in glide unit 30 by means of roller units 40 along with glide unit 31 by means of roller units 41. Since the entire mechanism is in equilibrium only a very little force is required to erect or collapse the main frame unit 13 into the control unit 3.

In describing the invention, reference has been made to a preferred embodiment and illustrative advantages of the invention. Those skilled in the art, however, and familiar with the instant disclosure of the subject invention, may recognize that numerous other modifications, variations, and adaptations may be made without departing from the scope of the invention. With these modifications, variations and adaptations can be applied to the various units/sub-systems within the apparatus.

What is claimed is:

1. An apparatus for transporting an individual from place to place when components of said apparatus are disposed in fixed, extended, deployed positions of use, said apparatus comprising:

a main frame unit including a first housing having a bottom surface, and a frame member, said frame member having a front end, a rear end, opposed, parallel side surfaces, and upper and lower surfaces;

first support means located along said bottom surface of said first housing, said first support means supporting said frame member within the region of said rear end in substantially a horizontal orientation;

motion producing means, said motion producing means connected between said rear end of said frame member and said bottom surface of said first housing, said motion producing means capable of imparting movement to said frame member either toward a retracted position of non-use below said bottom surface of said first housing, or toward an extended, deployed position of use;

a steering column disposed in a substantially perpendicular attitude, said steering column including a second housing, and a plurality of steering segment units;

mounting means for mounting said second housing on said upper surface of said frame member in a location within said front end, substantially equidistant between opposed, parallel side surfaces of said frame member;

telescopic mounting means for mounting each steering segment unit of said plurality of steering units on said second housing and moving each said steering segment unit in one or the other of a first direction into a fixed, extended, deployed position of use, and a second, opposite direction, into fixed, retracted, position of non-use;

control means for controlling directional movement of said apparatus;

second mounting means for mounting said control means on a steering segment unit furthest removed from said second housing when said steering segment units are disposed in said extended, deployed position of use;

a seat assembly including a lower seat member, a back support extending upward of said lower seat member, and a pair of arm supports extending forward, away from said back support, toward said front end of said frame member;

interconnecting each said lower seat member, said back support, and arm supports of said seat assembly;

third mounting means including a pedestal connected between said lower seat member of said seat assembly and said first housing, said third mounting means imparting movement to said pedestal for locating said seat unit in one of the other of said fixed, extended, deployed position of use, and said fixed, retracted, position of non-use;

a plurality of wheels supporting said main frame unit; and means for mounting two wheels of said plurality of wheels within said first housing at locations on opposed sides, furthest removed from said front end of said frame member, and a third wheel of said plurality of wheels to said second housing.

2. The apparatus of claim 1 wherein said second housing and each steering segment unit includes an internal chamber, and a pressure system including a first reservoir a medium under pressure, in said first reservoir, a valve operable to open communication between said first reservoir and said internal chamber of said second housing to pressurize the same, and as said pressure builds in said second housing a first steering segment unit of said plurality of steering segment units, followed by each subsequent steering segment unit, move seriatim to an extended, deployed position, and means providing a flow path between said internal chamber of said second housing and internal space of said first second steering segment unit, said means providing said flow path being replicated whereby successive pairs of internal chambers are pressurized moving further steering segment units to extended, deployed positions.

3. The apparatus of claim 2 including a control release valve opening said first reservoir to atmospheric conditions to release pressure within the pressure system whereby each said steering segment unit returns from its extended, deployed position to a retracted position of non-use.

4. The apparatus of claim 2 wherein said first reservoir includes a fluid medium.

5. The apparatus of claim 2 wherein said first reservoir is located in a closed pressure system including an hydraulic medium.

6. The apparatus of claim 1 wherein said control means includes a pair of handles, and support means supporting said handles to extend in substantially opposite directions.

7. The apparatus of claim 6 wherein said support means also supports each handle for movement between a substantially retracted position of non-use within said control unit and a fully extended, deployed position of use.

8. The apparatus of claim 7 wherein said support means in addition supports at least one of said handles for movement rotationally in one direction to control forward speed of said apparatus, and in the opposite direction to slow said forward movement.

9. The apparatus of claim 1 wherein said control means includes one or more of a forward/reverse switch for controlling operation of a source of power, and a read-out device.

10. The apparatus of claim 1 including a pull handle; means supporting said pull handle on said main frame unit, below said second housing, said pull handle being capable of movement between a retracted position of non-use an extended, deployed position of use.

11. The apparatus of claim 1 including a power unit, and means coupling a mechanical output of said power unit to at least one of a pair of rear wheels.

12. The apparatus of claim 11 wherein said power unit comprises a battery.

13. The apparatus of claim 11 wherein said power unit comprises a fuel cell.

14. The apparatus of claim 11 wherein said power unit comprises an Electrochemical "EC" capacitor.

15. The apparatus of claim 1 wherein said mounting means mounting said seat assembly and moving said seat assembly from positions of rest within each of a raised, deployed position and a lowered position of non-use substantially juxtaposed said second housing includes a main pressure unit having a chamber, a second reservoir; a medium under pressure in said second reservoir, a valve operable to open communication between said second reservoir and said chamber of said main pressure unit, and a member movable within said chamber in response to pressure increases and decreases.

16. The apparatus of claim 1 wherein said lower seat member includes a slot on opposite sides, said back support includes a pair of pins each received in a respective slot, and said back support capable of pivoting toward the rear of said apparatus about said pins to a substantially planar location relative to said lower seat member, and movable toward the front of said apparatus into a position juxtaposed said lower seat member as said pins move along respective slots from one end to the other.

17. The apparatus of claim 1 wherein said back support includes a slot on opposite sides, a pair of arm supports, and a pin extending from each arm support, said pins received in a respective slot in said back support for movement to any one of several adjustable locations there along including an end position whereby said arm rests locate juxtaposed said lower seat member.

18. The apparatus of claim 1 further comprising a controller having a preprogrammed microprocessor.

19. The apparatus of claim 18 wherein said preprogrammed microprocessor includes a selectable input element for adjustment of the speed of a drive motor.

20. The apparatus of claim 18 wherein said preprogrammed microprocessor includes a selectable input element for adjustment of a charge/discharge rate of a power source.

21. The apparatus of claim 1 wherein input producing means includes a first and second pair of spring units, each pair of spring units being balanced when said frame unit is in one of an extended, deployed position and retracted position of non-use and means introducing a force to unbalance said spring units whereby said frame unit will located to the other of said positions.

* * * * *